United States Patent [19]

McCaskey, Jr.

[11] 4,123,579
[45] Oct. 31, 1978

[54] RESIN COATED SUBSTRATE USING A SHORT-SET, HIGH-FLOW MELAMINE-FORMALDEHYDE IMPREGNATING RESIN

[75] Inventor: Harold O. McCaskey, Jr., Allendale, S.C.

[73] Assignee: Westinghouse Electric Corp., Pittsburgh, Pa.

[21] Appl. No.: 782,697

[22] Filed: Mar. 30, 1977

[51] Int. Cl.² .................. B32B 27/42; C08G 12/38
[52] U.S. Cl. .................. 428/264; 260/29.4 R; 428/268; 428/524; 428/527; 428/528; 428/530; 528/256
[58] Field of Search .......... 428/524, 526–528, 428/264, 262, 268, 531, 530; 156/331; 260/29.4 R, 67.6 R, 70 R; 264/258, 137

[56] References Cited

U.S. PATENT DOCUMENTS

| | | | |
|---|---|---|---|
| 2,908,603 | 10/1959 | Scott | 428/531 |
| 3,488,310 | 1/1970 | McCombs | 260/29.4 R |
| 3,496,131 | 2/1970 | Bornmann | 260/29.4 R |

FOREIGN PATENT DOCUMENTS 652,717  11/1962  Canada .................. 260/29.4 R

OTHER PUBLICATIONS

"Amino Resins" by Blais, Reinhold Pub. Co, 1959 pp. 19–20.

Primary Examiner—William A. Powell
Assistant Examiner—Michael W. Ball
Attorney, Agent, or Firm—D. P. Cillo

[57] ABSTRACT

A substrate is made for use as a top layer in a laminate; the substrate being impregnated with, and having a continuous film on its surface of, a dried, catalyzed, uncured resin, comprising the reaction product of 1 mole of melamine, about 1.8 moles to about 2.7 moles of uninhibited formaldehyde and about 0.05 mole to about 0.40 mole of urea; where the resin content of the substrate is between about 50 wt.% to about 85 wt.%, and the dried, continuous film on the substrate layer will cure within about 30 seconds to about 90 seconds, under pressures of between about 150 psi. to about 500 psi, without the formation of a discontinuous film.

10 Claims, 1 Drawing Figure

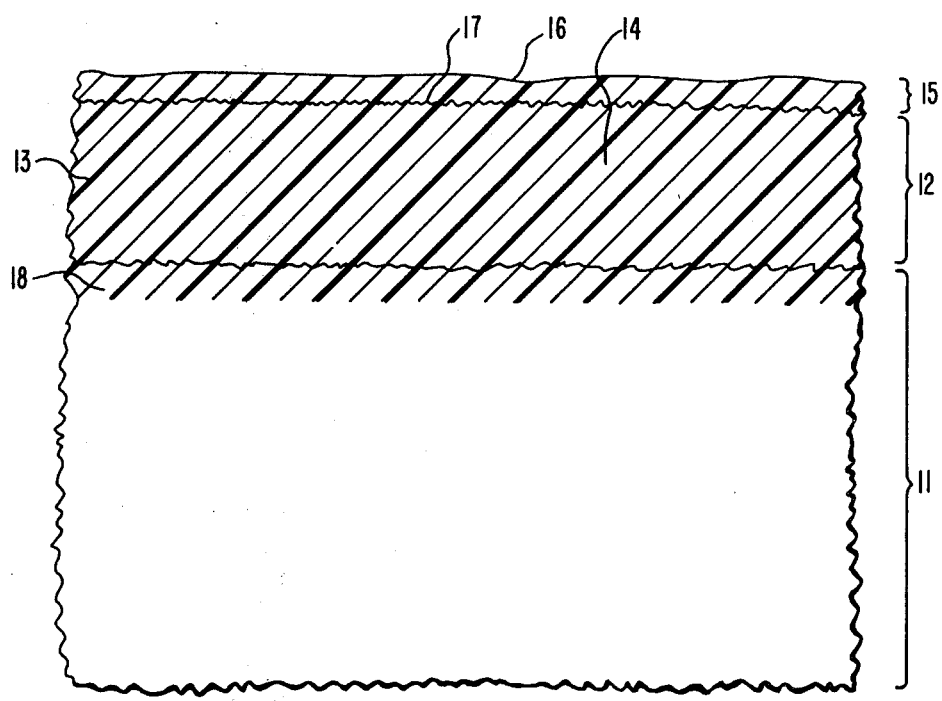

RESIN COATED SUBSTRATE USING A SHORT-SET, HIGH-FLOW MELAMINE-FORMALDEHYDE IMPREGNATING RESIN

BACKGROUND OF THE INVENTION

Melamine-formaldehyde resins are extensively used in the manufacture of high pressure decorative laminated plastics because of their transparency, resistance to abrasion, light stability, stain resistance, and relatively low cost. Their use in low pressure laminates, i.e., those molded at pressures of less than 500 psi. has been a problem, due to their low-flow characteristics.

Previous attempts to develop a highly-flowable melamine-formaldehyde resin, useful for low pressure applications, containing large quantities of external plasticizer, such as toluene sulfonamide, methyl glucoside or sucrose, and buffering systems such as guanadine carbonate have not been successful, due to poor laminate surface characteristics, as well as high costs.

Scott, in U.S. Pat. No. 2,908,603, sought to improve the flow characteristics of melamine-formaldehyde resins, for 1,000 psi. laminating applications, by initially forming a methylol melamine reaction product at 85° C. He then added cyclic ethylene urea and heated the materials at 85° C to 95° C, to completely react them to a 25% water dilutability point. Such compositions would have poor storage stability.

Bornmann, in U.S. Pat. No. 3,496,131, attempted to solve storage stability problems of melamine-formaldehyde resins, containing up to 20 wt.% of urea, thiourea, dicyanodiamide, guanidine or benzoguanamine, by adding 0.3 to 3 wt.% of cyanamide. He added the cyanamide to a single step reaction admixture of ingredients at 70° C, and heated at 90° C, to a 100% water dilutability point.

These resinous solutions have not proved to be completely satisfactory for low pressure laminating. For low pressure applications, the resin must be highly flowable, in order to provide a smooth, closed-pore, abrasion resistant film on the impregnated substrate surface. The resin must also set within a commercially acceptable time of about 90 seconds, at about 150 psi. to about 500 psi. In addition, under these quick-set, low pressure conditions, the resin must not all flow into the body of the porous substrate or it will provide a rough surface with a discontinuous film.

SUMMARY OF THE INVENTION

The above problems are solved and the above needs met, by providing a laminate and a dry, resin coated substrate using melamine resin incorporating uninhibited formaldehyde. This resin will contain urea as a flow promoter. The uninhibited formaldehyde used in the resin contains substantially no methanol and provides good set times.

The process, to make a laminate using this high-flow, short-set, low pressure impregnating resin, involves critical reaction steps and process controls. As a first step, 1 mole of melamine and about 1.8 moles to about 2.7 moles of uninhibited formaldehyde, adjusted to a pH of between about 8.0 to about 9.0 by the addition of an effective amount of an organic base, are reacted at about 85° C to about 110° C in an aqueous medium.

This reaction is continued until the solution clears, showing the dimethylol melamine reaction stage has been exceeded. At this point, the water dilutability point is over about 1,000%. To this reacted mixture, about 0.05 mole to about 0.40 mole of urea is added and reacted at about 75° C to about 85° C, until the water dilutability point is between about 200% to about 500%, to form a resinous reaction product.

This resinous reaction product is then diluted with water and organic base, to provide a solids content of from about 40 wt.% to about 60 wt.%, a viscosity of between about 10 cps. to about 100 cps. at 25° C, and a pH of between about 8 to about 10.5. An effective amount of a suitable catalyst and wetting agent for the melamine-formaldehyde resin is then added. The catalyst increases the curing rate and the wetting agent improves the impregnating capability of the resinous reaction product, and prevents streaking of the finished laminate surface. This method will provide a diluted resinous reaction product having low set times for the liquid resin, at atmospheric pressure, of between about 15 minutes to about 30 minutes at 150° C, and excellent flow characteristics after drying.

This diluted resin reaction product is then impregnated into a suitable porous sheet substrate, to a resin content of between about 50 wt.% to about 85 wt.%. It is then dried to a volatile content of between about 5 wt.% to about 15 wt.% to provide a substrate having a continuous, dried, catalyzed, uncured film on its surface. A stack-up is then formed of the impregnated sheet and a support. The stack-up is then heat and pressure consolidated at between about 150 psi. to about 500 psi. The resinous reacting product, after drying, is capable of curing within about 30 seconds to about 90 seconds in a 150 psi. to 500 psi. molding operation, without the formation of a discontinuous film, to provide a smooth, closed-pore, void-free, abrasion resistant, continuous film on the laminate surface. The short-set times and high-flow characteristics allow smooth surface film formation, rather than only interior saturation of the coated laminate.

BRIEF DESCRIPTION OF THE DRAWING

For a better understanding of the invention, reference may be made to the preferred embodiment, exemplary of the invention, shown in the sole accompanying FIGURE of a microscopic cross-section of the consolidated laminate stack-up of this invention, showing the thin, smooth, closed-pore, film coating the top of the sheet substrate surface.

DESCRIPTION OF THE PREFERRED EMBODIMENTS

Reaction of melamine ($C_3H_6N_6$) with formaldehyde (HCHO) produces a mixture of water-soluble methylol melamines. The methylol derivatives can possess up to six methylol groups per molecule and can include trimethylol melamine and hexamethylol melamine. The methylol content will depend on the melamine:formaldehyde ratio and the reaction conditions. On continued heating, the methylol melamines condense and a point can be eventually reached where hydrophobic resin will separate out on cooling. The resinification reaction is strongly dependent on the pH. Trimethylolmelamine has the formula

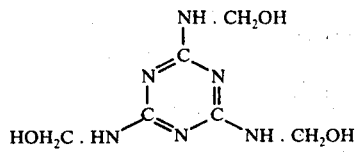

It is believed that the principal resinification reaction involves methylol-methylol condensations:

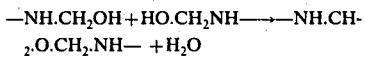

Methylene links may also be formed by the reaction:

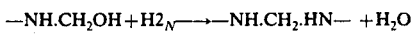

In the method of this invention, to provide a high-flow, fast-set resin, only uninhibited formaldehyde can be used in the reaction with melamine. By uninhibited formaldehyde is meant formaldehyde which contains substantially no methanol, which is usually added to formaldehyde solution (formalin) to improve storage stability. The uninhibited formaldehyde may, however, contain trace amounts of inert inhibitors and inert antifoam agents. The inclusion of the methanol in the formaldehyde apparently decreases the rate of reaction with melamine. Thus, inhibited formaldehyde is not useful for laminating at low pressures and low times, between 150 psi. to 500 psi., and up to 90 seconds, to form smooth, closed-pore films on the top of sheet substrates.

The melamine and uninhibited formaldehyde are mixed together, with sufficient water to form an aqueous solution, in a mole ratio of about 1.8 moles to about 2.7 moles of uninhibited formaldehyde for each 1 mole of melamine. Use of over about 2.7 moles of uninhibited formaldehyde per mole of melamine may cause resin setting before good flow can result in a closed pore surface, and it may also cause surface crazing. Use of under about 1.8 moles of uninhibited formaldehyde per mole of melamine may cause excessive flow into the support substrate, with resulting loss of the smooth resin film from the surface.

The pH of the mixture is controlled by the addition of an amount of a suitable base, such as, for example, sodium hydroxide, methanol amine, triethyl amine guanidine carbonate, sodium carbonate solution, or the like, effective to increase the pH to between about 8.0 to about 9.0. Over a pH of about 9.0, the reaction will be too slow. Under a pH of about 8.0, the reaction will be too fast and tend to become uncontrollable.

The mixture at this point will be cloudy. The mixture is then reacted at between about 85° C to about 110° C, for a time effective to exceed the dimethylolmelamine reaction product formation stage, i.e., until after the solution becomes clear, as is well known in the art. The total reaction time will usually range from about 20 minutes to about 120 minutes.

At this point in the reaction, the water dilutability point is over about 1,000%. At this point a positive cloud will be formed if one drop of the reaction product is added to a 600 ml breaker filled with ice water. Next, about 0.05 mole to about 0.40 mole of urea is added, and reacted at a temperature of between about 75° C to about 85° C, for a time effective to reduce the water dilutability point to between about 200% to about 500%. Percent water dilutability is defined as that percent by volume of water (based on resin) which is required to cloud a 20 ml. sample of the resin at 25° C. Over about 500% water dilutability may produce an unreacted melamine precipitate. Under about 200% water dilutability and the storage life of the resin will be decreased.

The inclusion of urea is necessary to promote flowability in the reaction product after impregnation into a substrate and drying, so that on low pressure molding, a close-pore film will be formed on the surface of the substrate. This film covers the rough paper surface of the substrate layer, and provides a smooth, abrasion resistant covering. Over about 0.40 mole of urea and excessive flow into the impregnated substrate and support can result, leaving a rough surface. Under about 0.05 mole of urea and all of the resin will drain into the substrate before it sets, so that no surface film is formed.

This resinous reaction product is then preferably mixed with a small amount of alcohol, such as ethyl alcohol, isopropyl alcohol, or their mixtures, effective to increase the storage life of the resin. Water is then added to dilute the resin and provide a solids content of between about 40 wt.% to about 60 wt.% and a viscosity of between about 10 cps. to about 100 cps. at 25° C. A suitable base, such as, for example, sodium hydroxide, methanol amine, triethyl amine, guanidine carbonate, sodium carbonate solution, or the like, is added in an amount effective to increase the pH to between about 8 to about 10.5. The final water dilutability after these additions is reduced to between about 85% to about 195%.

To increase the rate of cure, an effective amount of melamine-formaldehyde catalyst can be added, generally between about 0.10 wt.% to about 2.0 wt.% based on resin solids. Suitable catalysts are well known in the art and could include various types, for example, aminoiminomethane sulfinic acid, N-methylethanolamine acetate and other amine or amine salts, ammonium phosphate, ammonium chloride, hydrogen peroxide, stannous octoate, the disodium salt of ethylene diamine, tetracetic acid, t-butyl hydroperoxide, benzoyl peroxide, potassium persulfate, polyvalent metal fluorides such as titanium tetrafluoride and zinc fluoride, ammonium sulphamate, and ethylene sulphite, and the like.

To improve the impregnating capability and prevent streaking of the finished laminate surface an effective amount of wetting-agent can be added, generally between about 0.10 wt.% to about 4.0 wt.% based on resin solids. Suitable wetting-agents are well known in the art and could include various types, for example, polyalkylene glycol ethers, alkylaryl polyethers, linear alcohols having from 11 to 15 carbons, amine polyglycol condensates, polyethyoxy adducts, sodium heptadecyl sulfate, sodium tetradecyl sulfate, sodium 2-ethylhexyl sulfate, trimethylnonanol, potassium perfluoralkyl sulfonates, and ammonium perfluoroalkyl sulfonates, and the like.

These diluted resinous reaction product compositions are then used to coat and impregnate a suitable porous substrate or plurality of substrates, such as non-woven fabric, woven cloth, glass mat, kraft paper sheet, alpha cellulose paper sheet, and the like. The resin impregnated substrate can then be dried to the B stage, i.e., dry to the touch and capable of complete cure at elevated temperatures, in an oven at between about 50° C to about 150° C, for a time effective to reduce the volatile content of the impregnated substrate to between about 5 wt.% to about 15 wt.%. The resin content of the resin coated and impregnated substrate will generally be between about 50 wt.% to about 85 wt.% based on resin plus substrate weight.

The dried, resin impregnated substrate sheet or sheets can then be placed on a thick, porous support layer such as chipboard, plywood, a plurality of kraft paper sheets, and the like, and hot pressure molded for about 30 seconds to about 90 seconds, at about 150 psi. to about 500 psi. and between about 100° C to about 200° C.

As shown in the Drawing, this provides a consolidated laminated article, comprising support layer 11 and substrate sheet 12. The substrate sheet 12 is impregnated with resin 13. The resin is flowable during molding and has a short set time. It will not remain completely within the substrate sheet at point 14, but will flow during molding and remain as a thin film 15. This thin, continuous film is about 0.0001 inch to about 0.01 inch thick and has a smooth, closed-pore surface 16 which is also abrasion resistant.

The film remains on the top of the substrate sheet due to the short set time, which doesn't allow the resin to bleed completely within the substrate sheet 12 and support 11. If this film did not remain on top of the substrate sheet after drying and after molding, the rough surface fibers or filaments 17 of the paper sheet could protrude, causing an uneven, abrasive, non-continuous surface on the laminate. As shown, even though the resin has a short set time, it will impregnate a portion of the support layer as at point 18 to insure good bonding of the substrate sheet to the support.

EXAMPLE 1

A melamine-formaldehyde resin was made by mixing 31.5 lbs. (0.25 mole) of melamine crystals and 46.6 lbs. of 37 wt.% uninhibited formaldehyde solution (16.9 lbs. or 0.56 mole of uninhibited formaldehyde) with 10.0 lbs. of water and 68 grams of 10 wt.% sodium hydroxide, in a reaction vessel equipped with a reflux condenser and stirrer. This provided a cloudy solution having a pH of 8.6 and a mole ratio of 2.24 moles of uninhibited formaldehyde per mole of melamine. The solution was heated to reflux at 99° C for 10 minutes.

The heat was then reduced to about 91° C and held at that temperature for an additional 90 minutes, until the solution cleared and a positive cloud was formed when one drop of resin was added to a 600 ml. beaker filled with ice water. This indicated diminished water tolerance and that the dimethylolmelamine reaction stage was exceeded. Water dilutability was still over about 1,000%.

The temperature was then reduced to 80° C, and 3.7 lbs. (0.06 mole) of urea was added. This provided a composition having a mole ratio of 0.24 mole of urea per mole of melamine. The reaction was continued at 80° C until a 300% water dilutability point was reached, i.e., 80 cu. cm. of water -wt.% 20 cu. cm. of resin to become cloudy at 25° C [(80-20)/20](100). The reaction mixture was then cooled to 25° C, and 8.8 lbs. of water and 0.6 lbs. of isopropyl alcohol was added to provide a solids content of 49 wt.% and a viscosity of 22 cps. at 25° C. The pH was increased to 9.4 by the addition of 56 grams of 10 wt.% sodium hydroxide solution. The water dilutability at this point was 110% and the specific gravity was 1.21. A 25 gram sample of the resin was placed in a test tube and heated in a hot oil bath at 150° C to determine the set time of the resin at atmospheric pressure. The resin took 22 minutes to set to a completely solid thermoset state at atmospheric pressure.

To 75 lbs. of this 49 wt.% resin solids solution was added 0.16 lbs. (0.45 wt.% based on resin solids) of an amine salt type catalyst and 0.26 lbs. (0.7 wt.% based on resin solids) of an alkylaryl polyether wetting agent of the nonylphenoxy poly (ethyleneoxy) ethanol type. This resinous composition was placed in a dipping tank and used to impregnate a roll of 50 lb. basis weight alpha cellulose print paper. The impregnated paper was cut to 6 inch × 6 inch size and dried in an air circulating oven at 135° C for about 20 minutes, until a volatile content of 6 wt.% to 8 wt.% had been reached, i.e., the composition still contained some water, alcohol or other volatiles. The resin content of each sheet was about 60 wt.% and a thin, continuous film of the resin coated the dried, impregnated substrate.

Samples of the impregnated sheets were laid next to each other over a 45 lb. density, ¾ inch thick 36 inch × 36 inch chipboard support. This print sheet covered chipboard was placed in a press, chipboard side down, on top of a ⅛ inch polished steel plate. A release sheet of aluminum foil coated kraft paper was placed aluminum side down on top of the resin impregnated print sheets. A ⅛ inch polished steel plate was placed on top of the release sheet and the whole stack-up of chipboard support and resin impregnated substrate print layer was hot press molded at 300 psi. and 163° C for 65 seconds. At the end of the 65 second press cycle, the stack-up assembly was removed from the press while hot and microscopically inspected for surface appearance.

The surface of the sheet covering the chipboard support was coated with a film about 0.0005 inch to about 0.01 inch thick. The film was uniform, continuous, streak-free, smooth and pore-free, having excellent abrasion resistance. The film completely covered the paper so that no paper fibers protruded through it. The assembly was consolidated and completely bonded together. The resin composition proved to have excellent flow qualities and a fast set time in order to provide a film on top of the print sheet surface and not allow all of the resin to drain into the paper print sheet and chipboard support. Laminates made as described above passed the Resistance to Boiling Water Test (NEMA Test LD 12.02), and did not craze after 24 hours exposure in a 70° C oven. This provided an outstanding, low pressure molded, resin coated, resin impregnated print sheet substrate and laminate assembly. A wide variety of other wetting agents and other catalysts, such as aminoiminomethane sulfinic acid could be used with equally good results.

EXAMPLE 2

A low pressure molded, resin coated laminate was made using the same reaction conditions and resin components in about the same amounts as in EXAMPLE 1, except that 2.62 moles of uninhibited formaldehyde was used per mole of melamine. The reaction mixture before catalyst and wetting-agent addition had a solids content of 55 wt.%; a viscosity of 25 cps. at 25° C; a pH of 9.7, a water dilutability point of 150%; a specific gravity of 1.21 and a set time at 150° C and atmospheric pressure of 28 minutes.

After the 50 lb. basis weight alpha cellulose paper was impregnated, it was laminated to a 45 lb. density chipboard support under the same conditions as in EXAMPLE 1. At the end of the 65 second, 300 psi. and 163° C press cycle the assembly was inspected for surface appearance.

The surface of the sheet covering the chipboard support was coated with a film. The film was uniform, streak-free and while acceptable, the surface was in some portions beginning to show some porosity and loss of clarity, apparently indicating that the upper limit of formaldehyde addition was beginning to be reached.

The assembly was consolidated and completely bonded together, passed the Resistance to Boiling Water Test and did not craze after 24 hours of exposure in a 70° C oven.

EXAMPLE 3

A low pressure molded, resin coated laminate was made using the same reaction conditions and resin components in about the same amounts as in EXAMPLE 1, except that resin sample A used 0.1 mole of urea per mole of melamine; resin sample B used 0.33 mole of urea per mole of melamine and sample C used 0.46 mole of urea per mole of melamine. The sample A, B and C reaction mixture before catalyst and wetting-agent addition had a solids content of 49.7 wt.%, 49.3 wt.% and 49.8 wt.% respectively; a viscosity at 25° C of 29 cps., 25 cps., and 29 cps., respectively; a pH of 9.8, 9.5 and 9.6, respectively, and a water dilutability point of 140%, 140% and 140%, respectively.

After the 50 lb. basis weight alpha cellulose paper was impregnated, it was laminated to a 45 lb. density chipboard support under the same conditions as in EXAMPLE 1. At the end of the 65 second, 300 psi. and 163° C press cycle, the assembly was inspected for surface appearance.

In samples A and B, the surface of the sheet covering the chipboard support was coated with a film. The film was uniform and streak-free. In sample A the film was smooth and pore-free covering the paper completely. Sample B, while acceptable, in some portions was showing a very thin coating with some paper fibers almost protruding, indicating substantial resin flow into the print sheet apparently caused by the approach of the upper limit of urea addition.

Sample C showed excessive flow and provided an unacceptable roughened surface apparently indicating too much urea addition.

I claim:

1. A resin film coated substrate comprising at least one substrate layer impregnated with resin and having a continuous film on its surface of dried, catalyzed, uncured resin, the resin consisting essentially of the reaction product of 1 mole of melamine, 1.8 moles to 2.7 moles of uninhibited formaldehyde and 0.05 mole to 0.40 mole of urea; the resin, prior to drying, having had a solids content of between about 40 wt.% to about 60 wt.%, a pH of between about 8 to about 10.5 and a water dilutability of between about 85% to about 195%; wherein the resin content of the substrate is between about 50 wt.% to about 85 wt.%, and the dried continuous film on the surface of the substrate layer will cure within about 30 seconds to about 90 seconds, under pressures of between about 150 psi. to about 500 psi., and remain on the surface of the substrate after pressing without the formation of a discontinuous film.

2. The substrate of claim 1, wherein the film thickness is between about 0.0001 inch to about 0.1 inch thick.

3. The substrate of claim 2, wherein the substrate is material selected from the group consisting of non-woven fabric, woven cloth, glass mat, kraft paper sheet and alpha cellulose paper sheet.

4. The substrate of claim 2, wherein the reaction product contains about 0.10 wt.% to about 2.0 wt.% based on resin solids of a catalyst effective to increase the rate of cure and about 0.10 wt.% to about 4.0 wt.% of a wetting-agent effective to improve resin impregnating capability.

5. The substrate of claim 2, wherein the resin coated and impregnated substrate was dried at between about 50° C to about 150° C to a volatile content of between about 5 wt.% to about 15 wt.%.

6. A resin film coated heat and pressure consolidated laminate, comprising at least one top substrate layer bonded to a porous support; wherein the top substrate layer is impregnated with resin and has a continuous, cured resin film on its top surface, the resin consisting essentially of the cured reaction product of 1 mole of melamine, 1.8 moles to 2.7 moles of uninhibited formaldehyde and 0.05 mole to 0.40 mole of urea; wherein, before curing, the resin content of the substrate layer was between about 50 wt.% to about 85 wt.%, and the resin formed a film on the top surface of the substrate, and wherein the resin was cured during heat and pressure consolidation at between about 150 psi. to about 500 psi. within about 30 seconds to about 90 seconds, and the resin remained on the surface of the substrate after hot pressing without the formation of a discontinuous film.

7. The laminate of claim 6, wherein the film thickness on the surface of the substrate layer is between about 0.0001 inch to about 0.01 inch thick.

8. The laminate of claim 7, wherein the substrate layer is a material selected from the group consisting of non-woven fabric, woven cloth, glass mat, kraft paper sheet and alpha cellulose paper sheet.

9. The laminate of claim 7, wherein the reaction product contains about 0.10 wt.% to about 2.0 wt.% based on resin solids of a catalyst effective to increase the rate of cure and about 0.10 wt.% to about 4.0 wt.% of a wetting-agent effective to improve resin impregnating capability.

10. The laminate of claim 7 wherein the heat and pressure consolidation was at a temperature of between about 100° C to about 200° C.

* * * * *